(12) United States Patent
Onic et al.

(10) Patent No.: US 10,620,298 B2
(45) Date of Patent: Apr. 14, 2020

(54) RECEIVE CHAIN CONFIGURATION FOR CONCURRENT MULTI-MODE RADAR OPERATION

(71) Applicant: Infineon Technologies AG, Neubiberg (DE)

(72) Inventors: Alexander Onic, Linz (AT); Christian Michael Schmid, Linz (AT)

(73) Assignee: Infineon Technologies AG, Neubiberg (DE)

( * ) Notice: Subject to any disclaimer, the term of this patent is extended or adjusted under 35 U.S.C. 154(b) by 413 days.

(21) Appl. No.: 15/248,662

(22) Filed: Aug. 26, 2016

(65) Prior Publication Data

US 2018/0059216 A1 Mar. 1, 2018

(51) Int. Cl.
| G01S 7/35 | (2006.01) |
| G01S 13/34 | (2006.01) |
| G01S 13/93 | (2020.01) |
| G01S 13/931 | (2020.01) |

(52) U.S. Cl.
CPC .............. *G01S 7/352* (2013.01); *G01S 13/34* (2013.01); *G01S 13/931* (2013.01)

(58) Field of Classification Search
CPC ......... G01S 7/352; G01S 13/34; G01S 13/931
See application file for complete search history.

(56) References Cited

U.S. PATENT DOCUMENTS

| 5,274,380 A * | 12/1993 | Yatsuka ............... G01S 7/023 342/100 |
| 5,594,451 A | 1/1997 | Krikorian et al. |
| 6,580,385 B1 * | 6/2003 | Winner ............... G01S 7/4972 180/169 |
| 6,646,589 B2 * | 11/2003 | Natsume ............... G01S 7/354 342/107 |
| 6,784,791 B2 | 8/2004 | Rao et al. |
| 6,816,084 B2 * | 11/2004 | Stein ............... B60K 31/0008 340/435 |
| 6,879,281 B2 | 4/2005 | Gresham et al. |
| 6,967,574 B1 | 11/2005 | Nelson |

(Continued)

FOREIGN PATENT DOCUMENTS

| DE | 19952027 | 9/2001 |
| DE | 10009767 | 10/2001 |

(Continued)

OTHER PUBLICATIONS

Design of an FMCW radar baseband signal processing system for automotive applicaSpringerplus. 2016; 5: 42., Published online Jan. 18, 2016. doi: 10.1186/s40064-015-1583-5, retrieved Oct. 18, 2018 from https://www.ncbi.nlm.nih.gov/pmc/articles/PMC4717130/#CR2 (Year: 2016).*

(Continued)

*Primary Examiner* — Peter M Bythrow
(74) *Attorney, Agent, or Firm* — Harrity & Harrity, LLP (57) ABSTRACT

A frequency-modulated continuous-wave (FMCW) radar sensor may include a receive chain, where the receive chain includes a plurality of elements associated with processing a radar signal, where at least one element, of the plurality of elements, is configurable independent of at least one other element of the plurality of elements.

20 Claims, 5 Drawing Sheets

(56) References Cited

U.S. PATENT DOCUMENTS

| | | | |
|---|---|---|---|
| 7,100,726 B2* | 9/2006 | Kim | B60K 31/0008 180/169 |
| 7,132,976 B2* | 11/2006 | Shinoda | G01S 7/2925 342/70 |
| 7,275,431 B2* | 10/2007 | Zimmermann | G01S 13/87 342/126 |
| 7,504,988 B2* | 3/2009 | Tsuchihashi | G01S 13/34 342/158 |
| 7,592,945 B2* | 9/2009 | Colburn | G01C 9/00 342/118 |
| 7,724,180 B2* | 5/2010 | Yonak | G01S 13/931 342/70 |
| 7,860,344 B1 | 12/2010 | Fitzpatrick et al. | |
| 8,405,541 B2* | 3/2013 | Lee | G01S 13/0209 342/118 |
| 8,717,224 B2* | 5/2014 | Jeong | G01S 13/4463 342/70 |
| 8,797,206 B2 | 8/2014 | Uysal et al. | |
| 8,902,103 B2* | 12/2014 | Kim | G01S 13/345 342/118 |
| 9,063,225 B2* | 6/2015 | Lee | G01S 13/345 |
| 9,191,582 B1 | 11/2015 | Wright et al. | |
| 9,753,120 B2* | 9/2017 | Ramasubramanian | G01S 7/02 |
| 9,791,549 B2* | 10/2017 | Bi | G01S 7/35 |
| 9,829,566 B2* | 11/2017 | Rao | G01S 7/023 |
| 2003/0164791 A1* | 9/2003 | Shinoda | G01S 13/4463 342/70 |
| 2004/0252047 A1* | 12/2004 | Miyake | G01S 13/34 342/107 |
| 2007/0152871 A1* | 7/2007 | Puglia | G01S 7/352 342/70 |
| 2007/0205938 A1* | 9/2007 | Zimmermann | G01S 13/87 342/69 |
| 2008/0018526 A1* | 1/2008 | Wade | G01S 7/28 342/204 |
| 2008/0100500 A1* | 5/2008 | Kondoh | G01S 7/35 342/109 |
| 2008/0165049 A1* | 7/2008 | Wakayama | G01S 3/46 342/91 |
| 2008/0258964 A1* | 10/2008 | Schoeberl | G01S 7/032 342/189 |
| 2008/0303709 A1 | 12/2008 | Brosche et al. | |
| 2010/0039311 A1* | 2/2010 | Woodington | G01S 13/34 342/70 |
| 2013/0027240 A1* | 1/2013 | Chowdhury | G01S 7/032 342/94 |
| 2013/0234880 A1* | 9/2013 | Lee | G01S 13/345 342/70 |
| 2016/0139257 A1* | 5/2016 | Yamashina | G01S 13/584 342/109 |
| 2016/0238694 A1* | 8/2016 | Kishigami | G01S 7/023 |
| 2016/0320482 A1* | 11/2016 | Ling | G01S 13/931 |

FOREIGN PATENT DOCUMENTS

| | | |
|---|---|---|
| DE | 102005004371 | 9/2009 |
| DE | 102004034429 | 12/2009 |
| EA | 009250 | 12/2007 |
| JP | 2003161776 A | 6/2003 |
| JP | 2003185726 A | 7/2003 |
| JP | 2003248055 A | 9/2003 |
| JP | 2005525547 A | 8/2005 |
| JP | 2008039719 A | 2/2008 |
| JP | 5042558 B2 | 10/2012 |
| KR | 960036409 A | 10/1996 |
| KR | 20070065413 A | 6/2007 |
| KR | 20110062840 A | 6/2011 |
| KR | 101584449 B1 | 1/2016 |
| WO | WO 2007/014333 | 2/2007 |
| WO | WO 2008/001092 | 1/2008 |

OTHER PUBLICATIONS

Gazsi "Explicit Formulas for Lattice Wave Digital Filters" IEEE transactions on Circuits and Systems, vol. CAS-32, No. 1, pp. 68-88, Jan. 1985, 21 pages.

Wroblewski, "Bireciprocal Lattice Wave Digital Filters with Almost Linear Phare Response," https://mediatum.ub.tum.de/doc/650300/650300.pdf, 2003, 4 pages.

Mende et al., "The UMRR-S: A High-Performance 24GHz Multi Mode Automo-tive Radar Sensor for Comfort and Safety Applications," https://www.researchgate.net/publication/237977780_The_UMRR-S_A_High-Performance_24GHz_Multi_Mode_Automo-_tive_Radar_Sensor_for_Comfort_and_Safety_Applications, Aug. 2, 2003, 9 pages.

NXP, "Automotive Radar High-resolution 77 GHz radar," http://cache.nxp.com/files/microcontrollers/doc/fact_sheet/AUTORADARFS.pdf, Jun. 8, 2011, 2 pages.

Kuriakose et al., "An Automated Toolbox for the Design and Analysis of Lattice Wave Digital Filters using MATLAB," IEE Colloquium on DSP enabled Radio, 2003, 8 pages.

* cited by examiner

RECEIVE CHAIN CONFIGURATION FOR CONCURRENT MULTI-MODE RADAR OPERATION

BACKGROUND

A radar-based sensor may use frequency-modulated continuous-wave (FMCW) radar to determine a distance, a velocity, and/or an angular position of a target. Such radar-based sensors may be configured to operate in a short range radar (SRR) mode (e.g., with a detection range from approximately 0.05 meters (m) to approximately 20 m), a medium range radar (MRR) mode (e.g., with a detection range from approximately 1 m to 60 m), a long range radar (LRR) mode (e.g., with a detection range from approximately 10 m to 200 m), or the like.

SUMMARY

According to some possible implementations, a frequency-modulated continuous-wave (FMCW) radar sensor may include: a receive chain, where the receive chain includes a plurality of elements associated with processing a radar signal, and where at least one element, of the plurality of elements, is configurable independent of at least one other element of the plurality of elements.

According to some possible implementations, a radar sensor, may include: a first receive chain including a first plurality of elements associated with processing a radar signal, where at least one element, of the first plurality of elements, is configurable independent of at least one other element of the first plurality of elements and a second plurality of elements associated with a second receive chain; and the second receive chain including the second plurality of elements associated with processing the radar signal, where at least one element, of the second plurality of elements, is configurable independent of at least one other element of the second plurality of elements and the first plurality of elements associated with the first receive chain.

According to some possible implementations, a frequency-modulated continuous-wave (FMCW) radar sensor may include a plurality of elements to process a signal and provide an output, where the plurality of elements is associated with a receive chain of the FMCW radar sensor, and where an element, of the plurality of elements, is configurable independent of other elements of the plurality of elements.

DETAILED DESCRIPTION

The following detailed description of example implementations refers to the accompanying drawings. The same reference numbers in different drawings may identify the same or similar elements.

An application for an FMCW radar sensor may demand sensing capabilities across different distance ranges, and each range may have a different resolution requirement (e.g., range resolution, velocity resolution, bearing (i.e., angular) resolution, or the like). For example, an automotive application for an FMCW radar sensor (e.g., an advanced driver assistance system (ADAS), an autonomous driving system, or the like) may demand an FMCW radar sensor capable of operating in at least two modes, such as two of an ultra-SRR mode, an SRR mode, an MRR mode, and an LRR mode, at a given time during operation.

One technique for satisfying the demand for different sensing capabilities is to use an FMCW radar system that includes multiple FMCW radar sensors. Here, elements of a receive chain (e.g., including one or more radio frequency (RF) elements, digital elements, etc.) of each FMCW radar sensor are statically configured to provide sensing capabilities corresponding to a different range. For example, elements of a receive chain of a first FMCW radar sensor may be configured to provide SRR sensing capabilities, while elements of a receive chain of a second (i.e., different) FMCW radar sensor may be configured to provide MRR sensing capabilities. However, use of multiple FMCW radar sensors leads to increased cost (e.g., monetary, power consumption, processor usage, etc.) and/or complexity of the FMCW radar system. Moreover, the elements of the receive chains may be statically configured (i.e., not reconfigurable), thereby preventing the first FMCW radar sensor or the second FMCW radar sensor from operating in additional and/or different modes other than those for which the first and second FMCW radar sensors are initially configured.

Another technique for satisfying the demand for different sensing capabilities is to use an FMCW radar sensor that operates in multiple modes sequentially. For example, elements of a first receive chain of the FMCW radar sensor may be statically configured to provide SRR sensing capabilities, and elements of a second receive chain of the FMCW radar sensor may be statically configured to provide MRR sensing capabilities. Here, during operation, the FMCW radar sensor may switch back-and-forth between using the first receive chain (i.e., operating as an SRR sensor) and the second receive chain (i.e., operating as an MRR sensor). In other words, the FMCW radar sensor may sequentially operate in multiple modes, but may operate in only one mode at a given time. However, such sequential operation results in increased power consumption (e.g., as compared to a single mode of operation) and/or raises safety concerns associated with the FMCW radar sensor. Moreover, as described above, the elements of the receive chains may be statically configured, thereby preventing the FMCW radar sensor from being configured to operate in additional or different modes.

Implementations described herein provide an FMCW radar sensor with one or more receive chains that include independently configurable elements. In some implementations, such independently configurable elements allow the FMCW radar sensor to operate in multiple modes concurrently. In some implementations, the FMCW radar sensor may include multiple receive chains, where elements of each receive chain are independently configurable.

Figure 1:
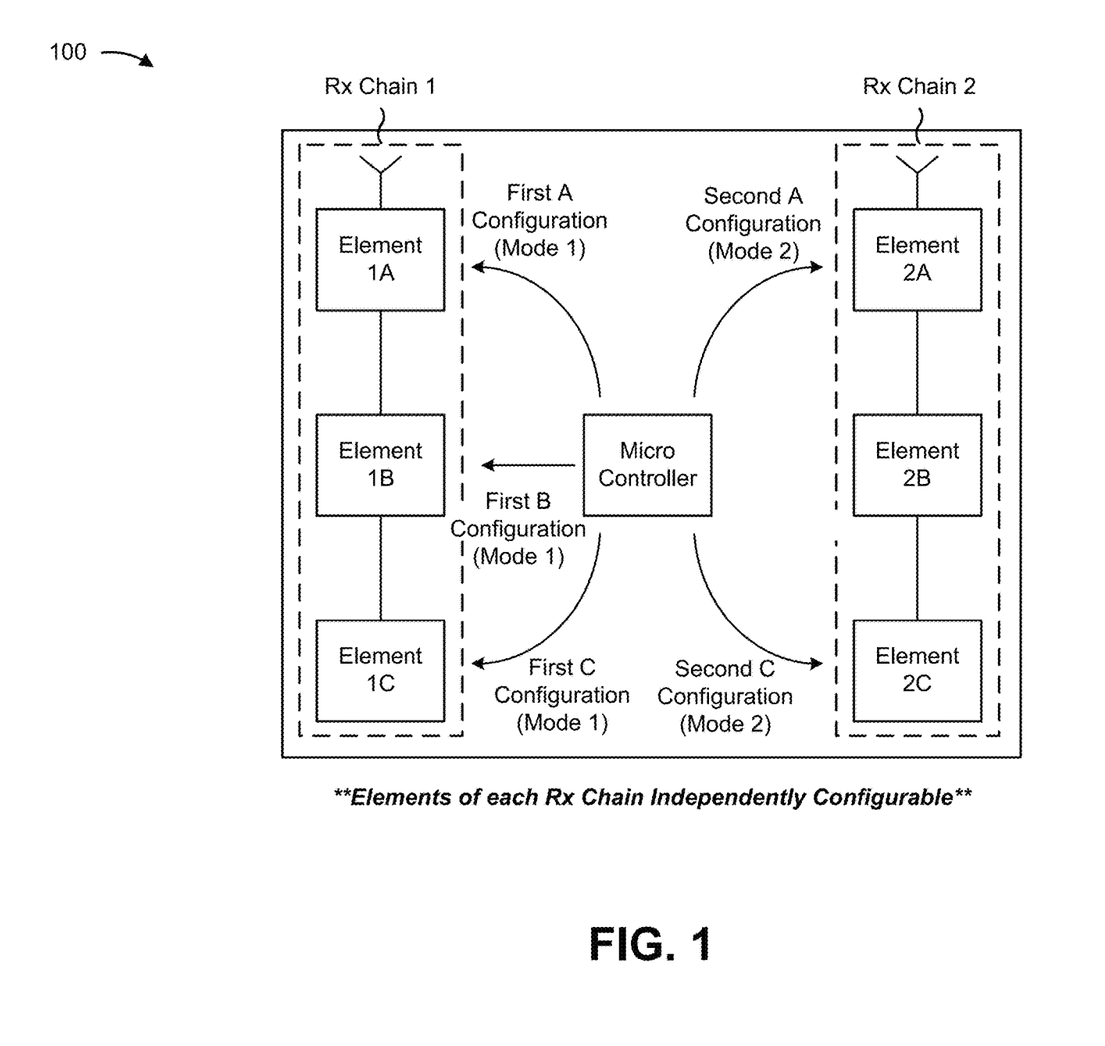
FIG. 1 is a diagram of an overview of an example implementation described herein.

FIG. 1 is a diagram of an overview of an example implementation 100 described herein. For the purposes of FIG. 1, assume that an FMCW radar sensor includes a first Rx chain including a first set of elements (e.g., element 1A, element 1B, and element 1C), a second Rx chain including a second set of elements (e.g., element 2A, element 2B, and element 2C), and a microcontroller. The set of elements may include one or more elements associated with processing a radar signal to provide a digital output, such as a low-noise amplifier, a mixer, an analog front end, an analog to digital convertor, a digital front end, or the like. Further, assume that the microcontroller determines that the FMCW radar sensor is to operate in a first mode (i.e., mode 1) for detecting targets in a first range of distances and a second mode (i.e., mode 2) for detecting targets in a second range of distances.

As shown in FIG. 1, the microcontroller may provide configuration information associated with elements of both the first Rx chain and the second Rx chain. The configuration information may include information that identifies a configuration or a setting of a parameter that governs a manner in which an element operates. In some implementations, the microcontroller may provide the configuration information to an element included in an Rx chain. Additionally, or alternatively, the microcontroller may provide the configuration information to a configuration register associated with storing configuration information corresponding to one or more elements of one or more Rx chains.

As further shown in FIG. 1, the microcontroller may provide first configuration information, associated with the first Rx chain, indicating that, in order to cause the first Rx chain to operate in the first mode, element 1A is to operate based on a first element A configuration, element 1B is to operate based on a first element B configuration, and element 1C is to operate based on a first element C configuration. As shown, each element of the first Rx chain may be independently configurable.

As further shown in FIG. 1, the microcontroller may also provide second configuration information, associated with the second Rx chain, indicating that, in order to cause the second Rx chain to operate in the second mode, element 2A is to operate based on a second element A configuration, and element 2C is to operate based on a second element C configuration. Notably, in this example, the microcontroller does not provide configuration information associated with element 2B (e.g., the microcontroller may determine that element 2B is already configured with a second element B configuration and does not need to be reconfigured). As shown, each element of the second Rx chain may be independently configurable. Moreover, as illustrated in this example, the FMCW radar sensor may include multiple Rx chains, each with one or more independently configurable elements. Here, due to the independent configuration of the elements of the first Rx chain and the second Rx chain, the FMCW radar sensor may operate in different modes concurrently. In some implementations, the elements of the Rx chains may be reconfigured (e.g., at a later time) in order to cause the FMCW radar sensor to provide sensing capabilities associated with one or more other ranges.

As indicated above, FIG. 1 is provided merely as an example. Other examples are possible and may differ from what was described with regard to FIG. 1. For example, while FIG. 1, and other example implementations described herein, are described in the context of an FMCW radar sensor, the techniques described herein may equally apply to another type of radar-based sensor.

Figure 2:
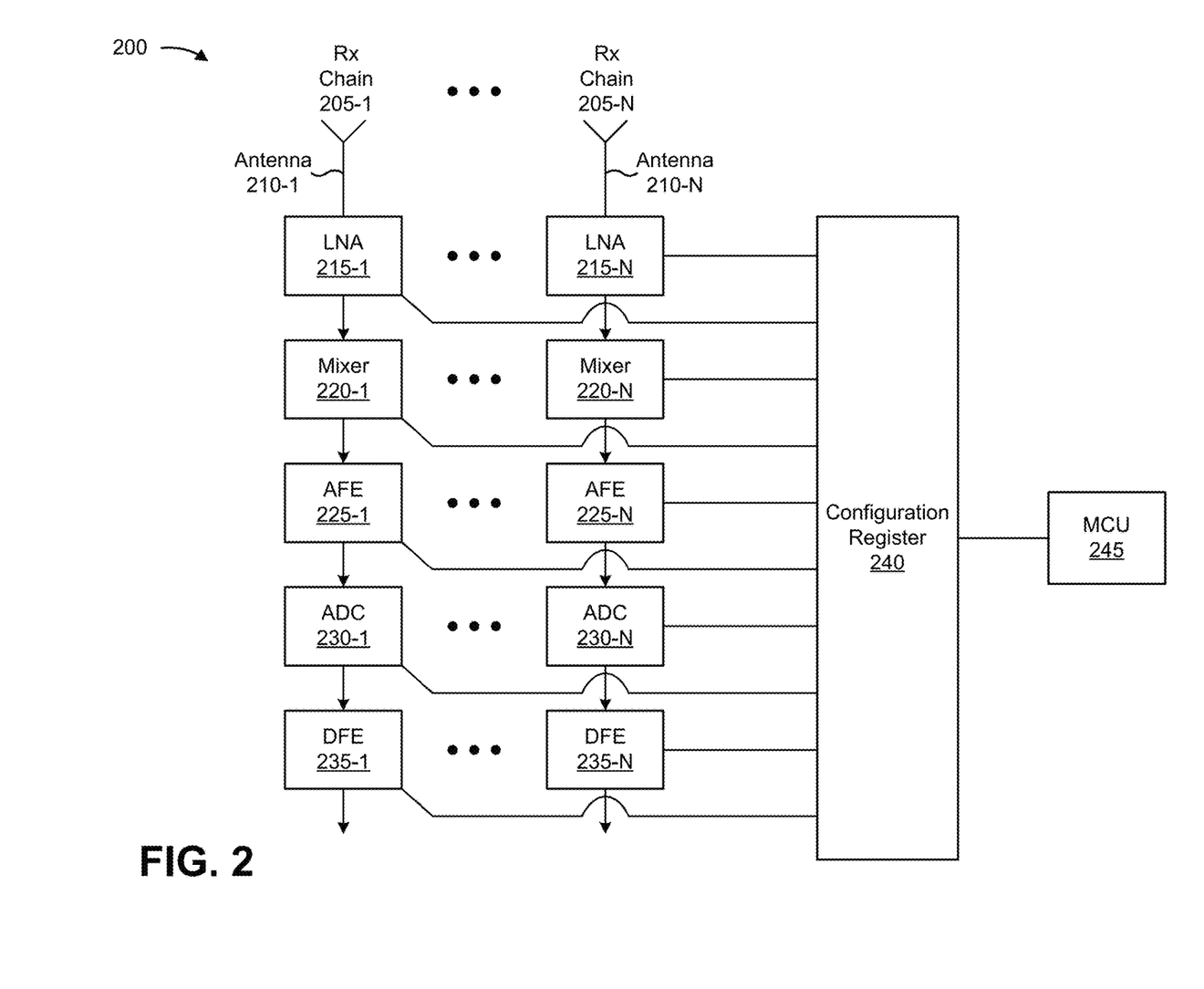
FIG. 2 is a diagram of an example FMCW radar sensor in which techniques, described herein, may be implemented.

FIG. 2 is a diagram of an example FMCW radar sensor 200 in which techniques, described herein, may be implemented. As shown in FIG. 2, FMCW radar sensor 200 may include a set of receive chains 205-1 through 205-N (N≥1) (herein referred to as Rx chain 205-1 through Rx chain 205-N). As shown, each Rx chain 205 may include an antenna 210 (e.g., antenna 210-1 through antenna 210-N), a low-noise amplifier (LNA) 215 (e.g., LNA 215-1 through LNA 215-N), a mixer 220 (e.g., mixer 220-1 through mixer 220-N), an analog front end (AFE) 225 (e.g., AFE 225-1 through AFE 225-N), an analog-to-digital (ADC) 230 (e.g., ADC 230-1 through ADC 230-N), and a digital front end (DFE) 235 (e.g., DFE 235-1 through DFE 235-N). As further shown, FMCW radar sensor 200 may further include a configuration register 240 and a microcontroller (MCU) 245.

In some implementations, FMCW radar sensor 200 may be implemented on a single integrated circuit (i.e., Rx chains 205, configuration register 240, and MCU 245 may be implemented on a single integrated circuit). Additionally, or alternatively, one or more Rx chains 205 of FMCW radar sensor 200 and configuration register 240 may be implemented on a single integrated circuit, while MCU 245 may be implemented on a different integrated circuit. Additionally, or alternatively, one or more Rx chains 205 of FMCW radar sensor 200 may be implemented on a single integrated circuit, while configuration register 240 and/or MCU 245 may be implemented on a different integrated circuit.

Rx chain 205 includes a set of elements associated with receiving and processing a radar signal, and providing an output (e.g., a digital output) corresponding to the radar signal. For example, as shown in FIG. 2, Rx chain 205 may include antenna 210, LNA 215, mixer 220, AFE 225, ADC 230, and DFE 235. Notably, while Rx chains 205 of FMCW radar sensor 200 are shown as having identical elements, one or more Rx chains of FMCW radar sensor 200 may include different elements.

In some implementations, one or more elements of Rx chain 205 may be independently configurable (e.g., based on information stored by configuration register 240 and/or information provided by MCU 245). In some implementations, FMCW radar sensor 200 may include multiple Rx chains 205. In some implementations, FMCW radar sensor 200 may include multiple Rx chains 205 arranged on a single integrated circuit.

Antenna 210 includes an element capable of receiving a radar signal (i.e., a radio wave) and converting the radar signal into an electrical signal for further processing by other elements of Rx chain 205. In some implementations, antenna 210 may be connected to LNA 215 such that antenna 210 may provide the electrical signal to LNA 215.

LNA 215 includes an element capable of amplifying an electrical signal. In some implementations, LNA 215 may be arranged to receive the electrical signal provided by antenna 210 and amplify the electrical signal without significantly degrading a signal-to-noise ratio (SNR) of the electrical signal. In some implementations, one or more parameters of LNA 215 may be configurable. For example, a gain parameter of LNA 215 may be configured based on information stored by configuration register 240 and/or provided by MCU 245 (i.e., LNA 215 may have a variable gain). In some implementations, LNA 215 may provide the amplified electrical signal to mixer 220.

Mixer 220 includes an element capable of mixing an amplified electrical signal (e.g., received from LNA 215) and an oscillating electrical signal, provided by a local oscillator (not shown), in order to create an electrical signal at an intermediate frequency (IF) (herein referred to as an IF electrical signal) that may be further processed by other elements of Rx chain 205. In some implementations, mixer 220 may provide the IF electrical signal to AFE 225.

AFE 225 includes one or more elements associated with filtering and/or processing an IF electrical signal (e.g., provided by mixer 220) to create an amplified and filtered electrical signal (herein referred to as an amplified/filtered electrical signal) for conversion by ADC 230. For example, AFE 225 may include one or more analog baseband filters, such as a high-pass filter, a low-pass filter, and a band-pass filter, or the like. In some implementations, one or more parameters of AFE 225 may be configurable. For example, a cut-off frequency of a filter included in AFE 225 may be configured based on information stored by configuration register 240 and/or provided by MCU 245. As another example, a gain parameter of a filter included in AFE 225 may be configured based on information stored by configuration register 240 and/or provided by MCU 245. In some implementations, AFE 225 may be connected to ADC 230 in order to allow AFE 225 to provide the amplified/filtered electrical signal to ADC 230.

ADC 230 includes an element capable of converting an amplified/filtered electrical signal (e.g., provided by AFE 225) from the analog domain to the digital domain. In other words, ADC 230 includes an element capable of converting the amplified/filtered electrical signal from an analog signal to a digital signal. In some implementations, one or more parameters of ADC 230 may be configurable. For example, a sampling rate of ADC 230 may be configured based on information stored by configuration register 240 and/or provided by MCU 245. As another example, a word length associated with ADC 230 may be configured based on information stored by configuration register 240 and/or provided by MCU 245. In some implementations, ADC 230 may be connected to DFE 235 in order to allow ADC 230 to provide the digital signal to DFE 235.

DFE 235 includes one or more elements associated with processing a digital signal (e.g., provided by ADC 230) and outputting the processed digital signal. For example, DFE 235 may include one or more digital baseband filters, a decimation filter (e.g., a bireciprocal wave digital filter (WDF)), a digital filter, an interpolator, a decimator, or the like. In some implementations, one or more parameters of DFE 235 may be configurable. For example, a filter characteristic (e.g., a cut-off frequency, a ripple, etc.) of a filter included in DFE 235 may be configured based on information stored by configuration register 240 and/or provided by MCU 245. As another example, an interpolation factor of an interpolator of DFE 235 may be configured based on information stored by configuration register 240 and/or provided by MCU 245. As another example, a decimation factor of a decimation filter included in DFE 235 may be configured based on information stored by configuration register 240 and/or provided by MCU 245. In some implementations, DFE 235 may output the processed digital signal (e.g., to MCU 245) for use in controlling a system associated with FMCW radar sensor 200, such as an ADAS, an autonomous driving system, or the like.

In some implementations, one or more elements of Rx chain 205 may be independently configurable (i.e., one element may be independently configurable from another element of the same Rx chain 205). For example, a filter included in an element of Rx chain 205 (e.g., an analog baseband filter included in AFE 225, a digital baseband filter included in DFE 235) may be a switchable filter, meaning that one or more parameters (e.g., a cut-off frequency) of the filter can be configured through use of one or more switches, included in the FMCW radar sensor 200 integrated circuit, that add or reduce resistance to the filter. In this example, MCU 245 may provide configuration information, associated with configuring the filter, to configuration register 240, and configuration register 240 may provide the configuration information to the filter (e.g., such that the switches operate in accordance with the configuration information in order to cause the filter to be configured with the desired cut-off frequency).

In this way, one or more elements of Rx chain 205 may be dynamically configured by configuration register 240 and/or MCU 245. For example, MCU 245 may configure a particular element by providing first configuration information to configuration register 240 and, at a later time (e.g., during operation of FMCW radar sensor 200, between operations of FMCW radar sensor 200), provide second configuration information in order to reconfigure the particular element. In some implementations, multiple elements of Rx chain 205 may be independently configurable.

Configuration register 240 includes a device capable of receiving, storing, and/or providing configuration information associated with configuring one or more elements of one or more Rx chains 205. For example, configuration register 240 may include a memory element capable of receiving, from MCU 245, configuration information associated with a particular element of a particular Rx chain 205, storing the configuration information, and providing the configuration information to the particular element of the particular Rx chain 205 (e.g., such that the particular element is configured to operate based on the configuration information).

In some implementations, configuration register 240 may store configuration information corresponding to multiple elements of Rx chain 205, where configuration information corresponding to each of the multiple elements is independently stored (e.g., such that each element of Rx chain 205 may be independently configured). Additionally, or alternatively, configuration register 240 may store configuration information corresponding to multiple Rx chains 205 (e.g., such that multiple elements of multiple Rx chains 205 may be independently configured). In some implementations, configuration register 240 may receive the configuration information from MCU 245.

MCU 245 includes a device capable of controlling operation of FMCW radar sensor 200. For example, MCU 245 may include a microcontroller, a microprocessor, a digital signal processor, or the like capable of identifying one or more modes in which FMCW radar sensor 200 is to operate, and determining and providing configuration information, corresponding to the one or more modes, to configuration register 240. In some implementations, MCU 245 may determine and provide configuration information corresponding to one or more elements of one or more Rx chains 205. In other words, MCU 245 may control configuration of individual elements of different Rx chains 205 included in FMCW radar sensor 200 (i.e., MCU 245 may control configuration of individual elements of different Rx chains 205 arranged on a same integrated circuit).

The number, arrangement, or type of elements and devices shown in FIG. 2 are provided as an example. In practice, there may be additional elements and/or devices, fewer elements and/or devices, different elements and/or devices, differently arranged elements and/or devices, and/or different types of elements and/or devices than those shown in FIG. 2. Furthermore, two or more elements and/or devices shown in FIG. 2 may be implemented within a single element and/or a single device, or a single element and/or a single device shown in FIG. 2 may be implemented as multiple, distributed elements or devices. Additionally, or alternatively, a set of elements (e.g., one or more elements) or a set of devices (e.g., one or more devices) of FMCW radar sensor 200 may perform one or more functions described as being performed by another set of elements or another set of devices of FMCW radar sensor 200.

Figure 3:
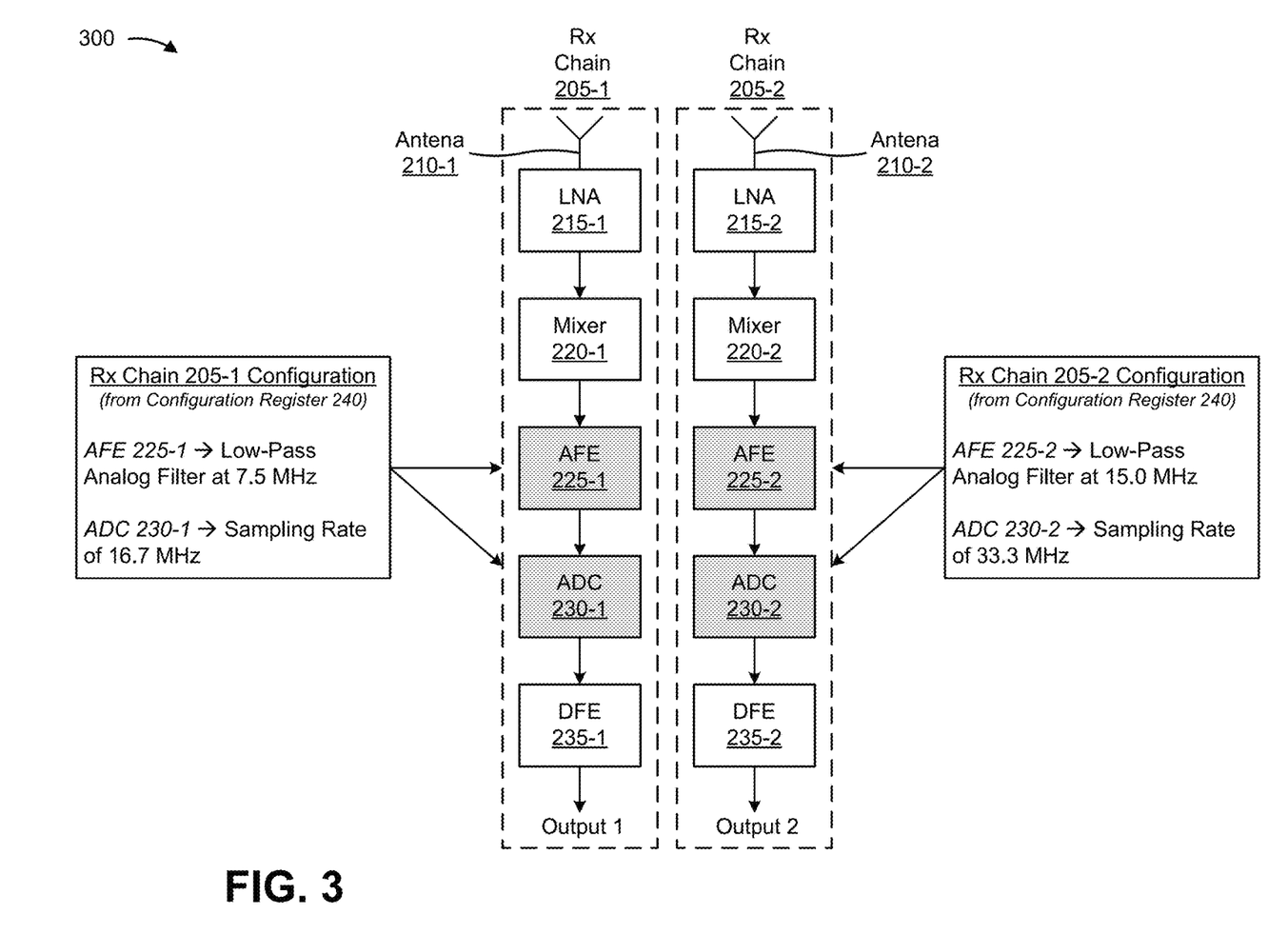
FIG. 3 is a diagram of an example implementation of an FMCW radar sensor with receive chains that are independently configurable to permit the FMCW radar sensor to operate in different modes concurrently.

FIG. 3 is a diagram of an example implementation 300 of FMCW radar sensor 200 with Rx chains 205 that are independently configurable to permit FMCW radar sensor 200 to operate in different modes concurrently. For the purposes of example implementation 300, assume that MCU 245 determines that FMCW radar sensor 200 is to operate in a first mode for detecting targets in a first range (e.g., 0 m to 35 m) with a first range resolution (e.g., 7.5 centimeters (cm)) and a second mode for detecting targets in a second range (e.g., 0 m to 70 m) with a second range resolution (e.g., 15.0 cm). As shown in FIG. 3, FMCW radar sensor 200 includes a first Rx chain 205 (e.g., Rx chain 205-1) and a second Rx chain 205 (e.g., Rx chain 205-2). Here, elements of each Rx chain 205 are independently configurable, as described above with regard to FIG. 2.

In this example, assume that a transmitter, associated with FMCW radar sensor 200, is configured to transmit a radar signal with a bandwidth of 2 gigahertz (GHz) (e.g., in order to enable the first range resolution of 7.5 cm) with a ramp duration of 61.4 microseconds (µs).

As shown in the box within the left portion of FIG. 3, elements of the first Rx chain 205 may be independently configured (e.g., independent of each other, independent of elements of the second Rx chain 205). For example, MCU 245 may provide, to configuration register 240, first configuration information associated with the first Rx chain 205. Here, the first configuration information may indicate that a low-pass analog filter, included in AFE 225-1 of the first Rx chain 205, is to be configured with a frequency of 7.5 megahertz (MHz), and that a sampling rate of ADC 230-1, included in the first Rx chain 205, is to be set at 16.7 MHz. This configuration may provide a range capability of approximately 0 m to approximately 35 m, a range resolution as low as 7.5 cm, a total of 1024 samples per ramp duration, and a processing gain of up to 30 decibels (dB).

In this example, configuration register 240 may store the first configuration information associated with the first Rx chain 205 such that AFE 225-1 is provided with, or has access to, information that causes AFE 225-1 to operate at the 7.5 MHz frequency, and such that ADC 230-1 is provided with, or has access to, information that causes ADC 230-1 to operate at the 16.7 MHz sampling rate. For example, configuration register 240 may push the configuration information to AFE 225-1 and/or ADC 230-1. As another example, AFE 225-1 and/or ADC 230-1 may read the configuration information from configuration register 240 before or during operation of FMCW radar sensor 200.

As shown in the box within the right portion of FIG. 3, elements of the second Rx chain 205 may also be independently configured (e.g., independent of each other, independent of the first Rx chain 205). For example, MCU 245 may provide, to configuration register 240, second configuration information associated with the second Rx chain 205. Here, the second configuration information may indicate that a low-pass analog filter, included in AFE 225-2 of the second Rx chain 205, is to be configured with a frequency of 15.0 MHz, and that a sampling rate of ADC 230-2, included in the second Rx chain 205, is to be set at 33.3 MHz. Such configuration of these elements of the second Rx chain 205 result in 2048 samples per ramp duration, however, only 1024 consecutive samples may be provided for further processing (e.g., in order to enable a consistent data output rate between the first Rx chain 205 and the second Rx chain 205 after a buffer). This configuration may provide a range capability of approximately 0 m to approximately 70 m, a range resolution as low as 15.0 cm, a total of 1024 samples per ramp duration, and a processing gain of up to 30 decibels (dB).

In this example, configuration register 240 may store the second configuration information associated with the second Rx chain 205 such that AFE 225-2 is provided with, or has access to, information that causes AFE 225-2 to operate at the 15.0 MHz, and such that ADC 230-2 is provided with, or has access to, information that causes ADC 230-2 to operate at the 33.3 MHz sampling rate. For example, configuration register 240 may push the configuration information to AFE 225-2 and/or ADC 230-2. As another example, AFE 225-2 and/or ADC 230-2 may read the configuration information from configuration register 240 before or during operation of FMCW radar sensor 200.

Notably, in this example, individual elements of a given Rx chain 205 are independently configurable. For example, with regard to the first Rx chain 205, AFE 225-1 and ADC 230-1 are independently configured. These elements are configured without modifying and/or changing a configuration (e.g., a default configuration, a previously stored configuration) of other elements of the first Rx chain 205 (e.g., LNA 215-1, DFE 235-1). Furthermore, in this example, elements of multiple Rx chains 205 are independently configurable (i.e., elements of multiple Rx chains 205 can be independently configured) in order to permit FMCW radar sensor 200 to operate in different modes concurrently.

In some implementations, the elements of the first Rx chain 205 and/or the second Rx chain 205 may be reconfigured (e.g., at a later time) in order to permit the first Rx chain 205 and/or the second Rx chain 205 to provide sensing capabilities associated with a different range. In such a case, MCU 245 may provide updated configuration information to configuration register 240, and the elements of the first Rx chain 205 and/or the second Rx chain 205 may be reconfigured, accordingly.

As indicated above, FIG. 3 is provided merely as an example. Other examples are possible and may differ from what was described with regard to FIG. 3. For example, FMCW radar sensor 200 may include a third Rx chain 205 that includes elements that may be independently configured to permit FMCW radar sensor 200 to operate in the first mode (e.g., using the first Rx chain 205), the second mode (e.g., using the second Rx chain 205) and a third mode (e.g., using the third Rx chain 205) concurrently.

Figure 4:
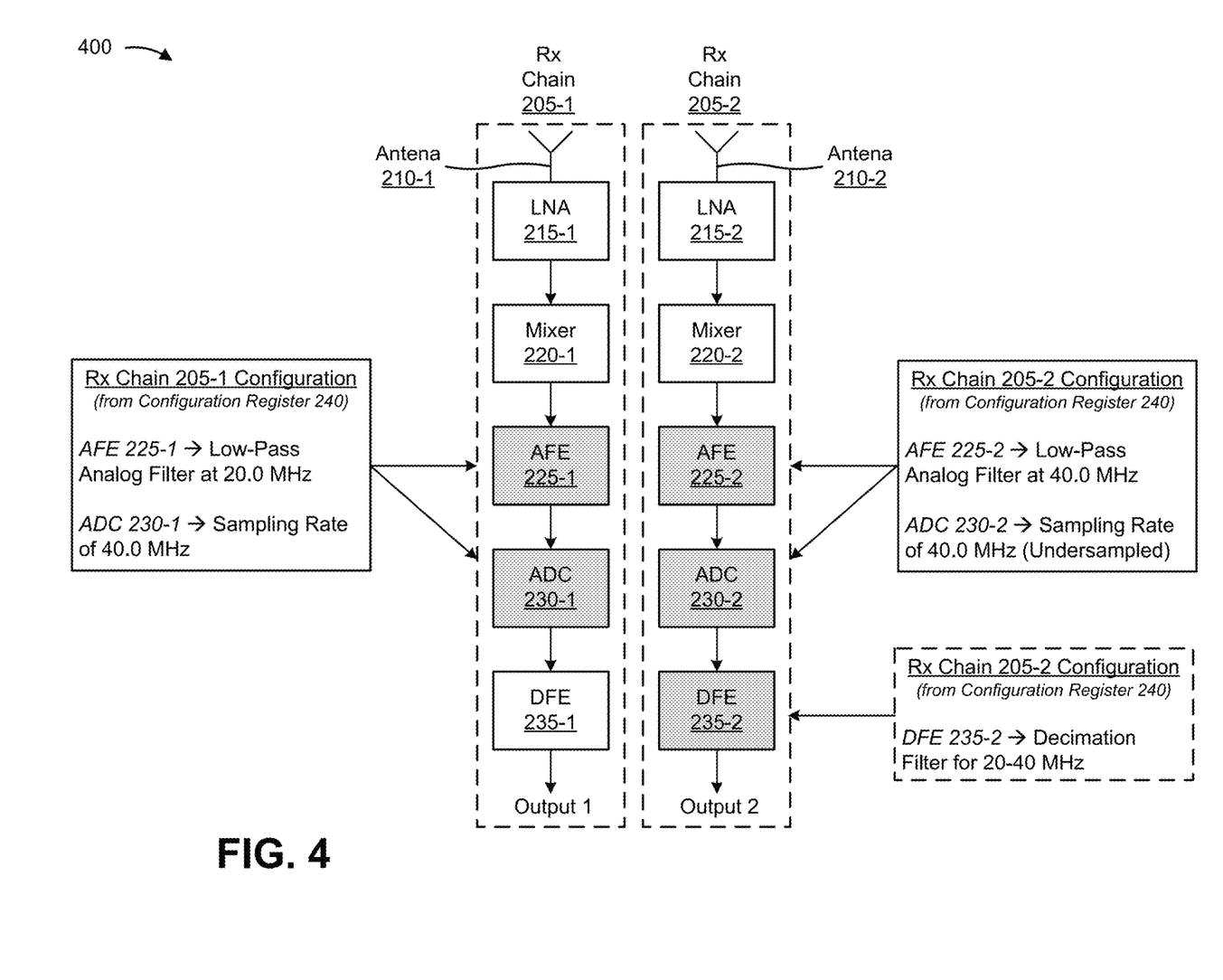
FIG. 4 is a diagram of an additional example implementation an FMCW radar sensor with receive chains that are independently configurable to permit the FMCW radar sensor to operate in different modes concurrently.

FIG. 4 is a diagram of an additional example implementation 400 of FMCW radar sensor 200 with Rx chains 205 that are independently configurable to permit FMCW radar sensor 200 to operate in different modes concurrently. For the purposes of example implementation 400, assume that MCU 245 determines that FMCW radar sensor 200 is to operate in a first mode for detecting targets in a first range (e.g., 0 m to 50 m) and a second mode for detecting targets in a second range (e.g., 0 m to 100 m). As shown in FIG. 4, FMCW radar sensor 200 includes a first Rx chain 205 (e.g., Rx chain 205-1) and a second Rx chain 205 (e.g., Rx chain 205-2). Here, elements of each Rx chain 205 are independently configurable, as described above with regard to FIG. 2.

As shown in the solid box within the left portion of FIG. 4, elements of the first Rx chain 205 may be independently configured (e.g., independent of each other, independent of the second Rx chain 205). For example, MCU 245 may provide, to configuration register 240, first configuration information associated with the first Rx chain 205. Here, the first configuration information may indicate that a low-pass analog filter, included in AFE 225-1 of the first Rx chain 205, is to be configured with a frequency of 20.0 MHz, and that a sampling rate of ADC 230-1, included in the first Rx chain 205, is to be set at 40.0 MHz. For purposes of example implementation 400, assume that such configuration of these elements of the first Rx chain 205 results in a range capability of the first Rx chain 205 of approximately 0 m to approximately 50 m.

In this example, configuration register 240 may store the first configuration information associated with the first Rx chain 205 such that AFE 225-1 is provide with, or has access to, information that causes AFE 225-1 to operate at the 20.0 MHz frequency, and such that ADC 230-1 is provided with, or has access to, information that causes ADC 230-1 to operate at the 40.0 MHz sampling rate.

As shown in the solid box within the right portion of FIG. 4, elements of the second Rx chain 205 may also be independently configured (e.g., independent of each other, independent of the first Rx chain 205). For example, MCU 245 may provide, to configuration register 240, second configuration information associated with the second Rx chain 205. Here, the second configuration information may indicate that a low-pass analog filter, included in AFE 225-2 of the second Rx chain 205, is to be configured with a frequency of 40.0 MHz, and that a sampling rate of ADC 230-2, included in the second Rx chain 205, is to bet set at 40.0 MHz. For purposes of example implementation 400, assume that such configuration of these elements of the second Rx chain 205 result in a range capability of the second Rx chain 205 of approximately 0 m to approximately 100 m.

In this example, configuration register 240 may store the second configuration information associated with the second Rx chain 205 such that AFE 225-2 is provided with, or has access to, information that causes AFE 225-2 to operate at the 40.0 MHz frequency, and such that ADC 230-2 is provided with, or has access to, information that causes ADC 230-2 to operate at the 40.0 MHz sampling rate.

Notably, in this example, ADC 230-2 is configured to under-sample an analog signal associated with the second Rx chain 205. For example, for a typical FMCW radar sensor 200 to achieve the desired 100 m range capability, the sampling rate of ADC 230-2 should be approximately equal to two times the analog bandwidth associated with AFE 225-2, or 80.0 MHz in this case (e.g., 40.0 MHz×2=80.0 MHz). In example implementation 400, the sampling rate of ADC 230-2 is configured to be 40.0 MHz, which is equal to both the sampling rate of ADC 230-1 and one-half of the typical sampling rate for ADC 230-2.

In some implementations, ADC 230-2 may be configured to under-sample the analog signal, provided by AFE 225-2, in order to cause ADC 230-2 to operate at a same sampling rate as ADC 230-1, thus allowing the first Rx chain 205 and the second Rx chain 205 to output data at a same data output rate. In such a case, operation of both ADC 230-1 and ADC 230-2 at the same sampling rate reduces complexity associated with realizing FMCW radar sensor 200, as different data output rates (resulting from the different sampling rates) may require different clocks to be configured on FMCW radar sensor 200 (i.e., multiple clocks may be needed on a single integrated circuit) which may increase an area of the integrated circuit, require additional elements to be arranged on the integrated circuit, decrease manufacturability of the integrated circuit, increase cost of the integrated circuit, or the like (e.g., as compared to an integrated circuit with a single clock).

However, under-sampling by ADC 230-2 may prevent the second Rx chain 205 of FMCW radar sensor 200 from distinguishing between a target that is located in the range corresponding to the lower portion of the analog bandwidth associated with the first Rx chain 205 (e.g., 0 to 20 MHz) and a target that is located in the range corresponding to the higher portion of the analog bandwidth associated with the second Rx chain 205 (e.g., 20 to 40 MHz). In other words, due to the under-sampling, FMCW radar sensor 200 may be unable to determine whether a target, identified by the second Rx chain 205, is in a range from 0 m to 50 m or a range from 50 m to 100 m. In some implementations, FMCW radar sensor 200 may resolve such an ambiguity by comparing information associated with the first Rx chain 205 chain and information associated with the second Rx chain 205.

For example, assume that the second Rx chain 205 chain detects a target at a particular time. Here, FMCW radar sensor 200 (e.g., MCU 245) may determine, based information provided by the first Rx chain 205, whether the first Rx chain 205 chain detected a target at the particular time. If FMCW radar sensor 200 determines that the first Rx chain 205 did not detect a target at the particular time, then FMCW radar sensor 200 may determine that the target detected by the second Rx chain 205 chain is located in the range corresponding to the higher portion of the analog bandwidth associated with the second Rx chain 205 (i.e., that the target is within the 50 m to 100 m range). Alternatively, if FMCW radar sensor 200 determines that the first Rx chain 205 detected a target at the particular time, then FMCW radar sensor 200 may determine that the target detected by the second Rx chain 205 chain is located in the range corresponding to the lower portion of the analog bandwidth associated with the first Rx chain 205 (i.e., that the target is within the 0 m to 50 m range). In such a case, FMCW radar sensor 200 may exclude (i.e., ignore) the target detected by the second Rx chain 205.

In some implementations, FMCW radar sensor 200 may be capable of resolving ambiguities among multiple (e.g., two or more) Rx chains 205, while maintaining a constant sampling rate and/or data output rate across the multiple Rx chains 205. For example, in addition to the first Rx chain 205 and the second Rx chain 205 described above, FMCW radar sensor 200 may include a third Rx chain 205 that is configured to provide sensing capabilities for a third range (e.g., a longer range). In such a case, a third analog signal (e.g., filtered based on a frequency of 80 MHz), associated with the third Rx chain 205, may also be under-sampled at 40 MHz, which is equal to one-quarter of the typical 160 MHz sampling rate. Here, FMCW radar sensor 200 may resolve ambiguities between the first Rx chain 205, the second Rx chain 205, and the third Rx chain 205 by comparing information provided by the first Rx chain 205, the second Rx chain 205, and the third Rx chain 205, in the manner described above.

In some implementations, FMCW radar sensor 200 may resolve such ambiguities when the under-sampled sampling rate, associated with the first Rx chain 205, matches the sampling rate of the second Rx chain 205, as described above. In such a case, different Rx chains 205 of FMCW radar sensor 200 may be capable of concurrently providing sensing capabilities in different ranges, while maintaining a same sampling rate and/or a same data output rate.

Additionally, or alternatively, FMCW radar sensor 200 may resolve an ambiguity when the under-sampled sampling rate, associated with the first Rx chain 205, does not match (i.e., is different from) the sampling rate of the second Rx chain 205. However, while the above-described principle of exclusion may still be implemented in such a case, the different sampling rates may negatively impact cost and/or complexity of FMCW radar sensor 200, since the sampling rates (resulting in different data output rates) of the first Rx chain 205 and the second Rx chain 205 may require different clocks to be arranged on FMCW radar sensor 200, as described above.

In some implementations, an element of FMCW radar sensor 200 may be configured to prevent an ambiguity caused by under-sampling (e.g., rather than implementing the exclusion technique described above). For example, as shown by the dashed box in the lower right portion of FIG. 4, a decimation filter of DFE 235-1 may be configured such that only targets that are in the range (e.g., 50 m to 100 m) corresponding to the higher portion of the analog bandwidth associated with the first Rx chain 205 (e.g., 20 to 40 MHz) are identified by the second Rx chain 205. In other words, in some implementations, an element of the second Rx chain 205 of FMCW radar sensor 200 may be configured to prevent an ambiguity, rather than to resolving the ambiguity.

In some implementations, DFE 235 may include a bireciprocal WDF in order to prevent an ambiguity. Continuing with the above example, DFE 235-2 may include a bireciprocal WDF in order to prevent an ambiguity. In such a case, the half-band characteristic of the bireciprocal WDF causes the bireciprocal WDF to create two digital signals from the digital signal provided by ADC 230-2. Here, a first digital signal of the bireciprocal WDF may correspond to the range associated with the lower portion of the analog bandwidth of the second Rx chain 205 (i.e., the 0 m to 50 m range), and a second digital signal of the bireciprocal WDF may correspond to the range associated with the higher portion of the analog bandwidth of the second Rx chain 205 (i.e., the 50 m to 100 m range). In other words, DFE 235-2 may select the portion of the input digital signal that corresponds to the higher portion of the analog bandwidth. This technique may be referred to as band selection. In such a case, DFE 235-2 may provide the second digital signal (e.g., corresponding to the 50 m to 100 m range) as an output (e.g., after further processing).

In some implementations, use of a bireciprocal WDF to prevent an ambiguity may reduce cost (e.g., monetary, power consumption, processor usage), area, and/or complexity of FMCW radar sensor 200 as compared to another technique that may be used to achieve such band selection, such as use of a digital filter bank.

Notably, in this example, individual elements of a given Rx chain 205 are independently configurable. For example, with regard to the first Rx chain 205, AFE 225-1 and ADC 230-1 are independently configured based on information stored by configuration register 240. Here, these elements are configured without modifying and/or changing a configuration (e.g., a default configuration, a previously stored configuration) of other elements of the first Rx chain 205 (e.g., LNA 215-1, DFE 235-1). Furthermore, in this example, elements of multiple Rx chains 205 are independently configurable (i.e., multiple Rx chains 205 can be independently configured) in order to permit FMCW radar sensor 200 to operate in different modes concurrently.

In some implementations, the elements of the first Rx chain 205 and/or the second Rx chain 205 may be reconfigured (e.g., at a later time) in order to permit the first Rx chain 205 and/or the second Rx chain 205 to provide sensing capabilities associated with a different range. In such a case, MCU 245 may provide updated configuration information to configuration register 240, and the elements of the first Rx chain 205 and/or the second Rx chain 205 may be reconfigured, accordingly.

As indicated above, FIG. 4 is provided merely as an example. Other examples are possible and may differ from what was described with regard to FIG. 4. For example, FMCW radar sensor 200 may include a third Rx chain 205 that includes elements that may be independently configured to permit FMCW radar sensor 200 to operate in the first mode (e.g., using the first Rx chain 205), the second mode (e.g., using the second Rx chain 205), and a third mode (e.g., using the third Rx chain 205) concurrently.

Figure 5:
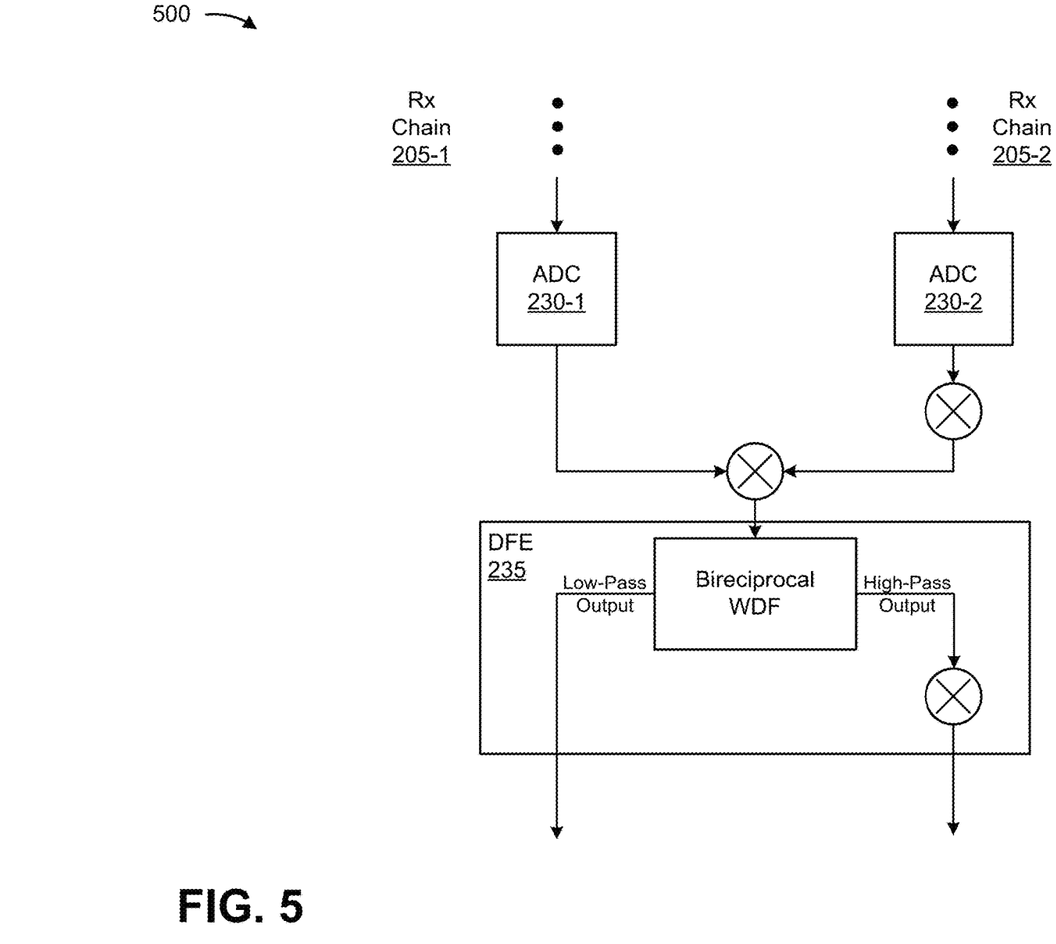
FIG. 5 is a diagram of an example implementation of an FMCW radar sensor that includes a single bireciprocal wave digital filter for use by multiple receive chains.

In some implementations, FMCW radar sensor 200 may include a single bireciprocal WDF for use by multiple Rx chains 205. FIG. 5 is a diagram of an example implementation 500 of FMCW radar sensor 200 that includes a single bireciprocal WDF, included in a combined DFE 235 (e.g., a DFE 235 capable of processing signals associated with both Rx chain 205-1 and Rx chain 205-2) for use by multiple Rx chains 205.

As shown in FIG. 5, the bireciprocal WDF may be arranged such that the bireciprocal WDF receives a first digital signal, associated with a first Rx chain 205, and a second digital signal associated with a second Rx chain 205. Here, the first digital signal and the second digital signal may be combined by frequency multiplexing. For example, the second digital signal may be modulated into a frequency interval that would otherwise be free after processing AFE 225-2. In some implementations, three or more digital signals may be similarly processed (e.g., when a target sampling rate and initial spectra allow).

In this example, the second digital signal (e.g., associated with an analog bandwidth of 0 MHz to 22 MHz) may be multiplied with an alternating sequence (e.g., $a[n]=(-1)^n$) to create a modified digital signal (e.g., as shown by the upper multiplier in FIG. 5). Here, a resulting spectrum, associated with a bandwidth supported by the digital signal, is a shifted (e.g., as compared to a spectrum without multiplication by the alternating sequence). In this example, assuming a sampling rate of 100 MHz by ADC 230-0, the shifted spectrum shows support associated with an analog bandwidth of 28 MHz to 50 MHz (e.g., rather than 0 MHz to 22 MHz).

Next, as shown by the adder in FIG. 5, the first digital signal may be added to the modified digital signal. Here, even when the first digital signal is also associated with the 0 MHz to 22 MHz analog bandwidth, the corresponding spectra do not interfere. The combined digital signal may then be processed by the bireciprocal WDF of combined DFE 235 (e.g., decimation may be applied to the combined digital signal). In this way, a single bireciprocal WDF in a combined DFE 235 may simultaneously process both the first digital signal and the second digital signal. Thus, a single bireciprocal WDF may be used, thereby reducing cost and/or complexity of FMCW radar sensor 200 (e.g., as compared to an FMCW radar sensor 200 that includes a separate WDF in each Rx chain 205). In some implementations, one or more parameters of the bireciprocal WDF may be independently configurable (e.g., based on information stored by configuration register 240 and/or provided by MCU 245).

In this example, the bireciprocal WDF may, during processing, separate the combined digital signal into a low-pass output, corresponding to the first digital signal, and a high-pass output corresponding to the second digital signal (e.g., a half-band low-pass bireciprocal WDF, as used as a decimation filter, is able to determine an equivalent high-pass output with negligible cost, and thus separate the combined digital signal). As shown by the lower multiplier in FIG. 5, the high-pass output may then be multiplied by the alternating sequence such that the high-pass output is representative of the 0 MHz to 22 MHz analog bandwidth (e.g., a down-modulation of the frequency-shifted signal restores the baseband representation of the signal). The low pass output and the high pass output may then be further processed by one or more other elements of combined DFE 235.

As indicated above, FIG. 5 is provided merely as an example. Other examples are possible and may differ from what was described with regard to FIG. 5.

Implementations described herein provide an FMCW radar sensor with one or more receive chains that include independently configurable elements. In some implementations, such independently configurable elements allow the FMCW radar sensor to operate in multiple modes concurrently. In some implementations, the FMCW radar sensor may include multiple receive chains, where elements of each receive chain may be independently configurable (e.g., independent of other elements of the same receive chain, independent of elements of a different receive chain, and/or the like).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term element is intended to be broadly construed as hardware, firmware, and/or a combination of hardware and software.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A frequency-modulated continuous-wave (FMCW) radar sensor, comprising:
   a receive chain,
      where the receive chain includes a plurality of elements associated with processing a radar signal received by the FMCW radar sensor,
      where at least one of a filter included in an analog front end, of the plurality of elements, or a sampling rate of an analog-to-digital converter, of the plurality of elements, is reconfigurable independent of at least one other element of the plurality of elements to change a sensing capability of the receive chain from corresponding to a first distance range to corresponding to a second distance range.

2. The FMCW radar sensor of claim 1, where the receive chain is a first receive chain and the plurality of elements is a first plurality of elements, and
   where the FMCW radar sensor further comprises:
      a second receive chain including a second plurality of elements associated with processing the radar signal received by the FMCW radar sensor,
         where at least one element, of the second plurality of elements, is reconfigurable independent of at least one other element of the second plurality of elements and independent of the first plurality of elements to change a sensing capability of the second receive chain from corresponding to a third distance range to corresponding to a fourth distance range.

3. The FMCW radar sensor of claim 1, where the receive chain is a first receive chain and the plurality of elements is a first plurality of elements, and
   the first plurality of elements to cause the FMCW radar sensor to operate in a first mode associated with the first distance range, and
   where the FMCW radar sensor further comprises:
      a second receive chain including a second plurality of elements associated with processing the radar signal received by the FMCW radar sensor,
      the second plurality of elements to cause the FMCW radar sensor to operate in a second mode associated with a third distance range,
      the third distance range being different from the first distance range, and
      the first plurality of elements and the second plurality of elements causing the FMCW radar sensor to operate in the first mode and the second mode concurrently.

4. The FMCW radar sensor of claim 3, where a first data output rate, associated with the first mode, matches a second data output rate associated with the second mode.

5. The FMCW radar sensor of claim 3, where the second plurality of elements includes flail another filter to perform band selection associated with a digital signal corresponding to the second receive chain.

6. The FMCW radar sensor of claim 3, where the first plurality of elements and the second plurality of elements are arranged on a single integrated circuit.

7. The FMCW radar sensor of claim 1, where the receive chain is a first receive chain, and the plurality of elements is a first plurality of elements, and
   where the FMCW radar sensor further comprises:
      a second receive chain including a second plurality of elements associated with processing the radar signal received by the FMCW radar sensor, and
      a wave digital filter to process a combined digital signal associated with the first receive chain and the second receive chain,
         the wave digital filter being included in both the first plurality of elements and the second plurality of elements.

8. A radar sensor, comprising:
a first receive chain including a first plurality of elements associated with processing a radar signal received by the radar sensor,
at least one of a filter included in an analog front end, of the first plurality of elements, or a sampling rate of an analog-to-digital converter, of the first plurality of elements, being reconfigurable independent of at least one other element of the first plurality of elements and a second plurality of elements associated with a second receive chain to change a sensing capability of the first receive chain from corresponding to a first distance range to corresponding to a second distance range, and
the second receive chain including the second plurality of elements associated with processing the radar signal received by the radar sensor,
at least one element, of the second plurality of elements, being reconfigurable independent of at least one other element of the second plurality of elements and the first plurality of elements associated with the first receive chain to change a sensing capability of the second receive chain from corresponding to a third distance range to corresponding to a fourth distance range.

9. The radar sensor of claim 8, where the radar sensor is a frequency-modulated continuous-wave radar sensor.

10. The radar sensor of claim 8, where the first plurality of elements causes the radar sensor to operate in a first mode associated with the first distance range, and where the second plurality of elements causes the radar sensor to operate in a second mode associated with the third distance range,
the third distance range being different from the first distance range, and
the first plurality of elements and the second plurality of elements causing the radar sensor to operate in the first mode and the second mode concurrently.

11. The radar sensor of claim 10, where the sampling rate of the analog-to-digital converter is a first sampling rate, associated with the first mode, that does not match a second sampling rate of the analog-to-digital converter, associated with the second mode.

12. The radar sensor of claim 10, where the second plurality of elements includes a digital filter to perform band selection associated with a digital signal corresponding to the second receive chain.

13. The radar sensor of claim 8, further comprising:
a configuration register to store configuration information used to reconfigure one or more of the first plurality of elements or one or more of the second plurality of elements.

14. The radar sensor of claim 8, further comprising:
a wave digital filter to process a combined digital signal associated with the first receive chain and the second receive chain,
the wave digital filter being included in the first plurality of elements and the second plurality of elements.

15. A frequency-modulated continuous-wave (FMCW) radar sensor, comprising:
a plurality of elements to process a signal received by the FMCW radar sensor and provide an output,
the plurality of elements being associated with a receive chain of the FMCW radar sensor, and
at least one of a filter included in an analog front end, of the plurality of elements, or a sampling rate of an analog-to-digital converter, of the plurality of elements, being reconfigurable independent of other elements of the plurality of elements to change a sensing capability of the receive chain from corresponding to a first distance range to corresponding to a second distance range.

16. The FMCW radar sensor of claim 15, where the plurality of elements is a first plurality of elements, the receive chain is a first receive chain, and the output is a first output, and
where the FMCW radar sensor further comprises:
a second plurality of elements to process the signal received by the FMCW radar sensor and provide a second output,
the second plurality of elements being associated with a second receive chain of the FMCW radar sensor, and
an element, of the second plurality of elements, being reconfigurable independent of other elements of the second plurality of elements and the first plurality of elements to change a sensing capability of the second receive chain from corresponding to a third distance range to corresponding to a fourth distance range.

17. The FMCW radar sensor of claim 15, where the plurality of elements is a first plurality of elements, the receive chain is a first receive chain, and the output is a first output, and
the first plurality of elements causing the FMCW radar sensor to operate in a first mode associated with the first distance range, and
where the FMCW radar sensor further comprises:
a second plurality of elements to process the signal received by the FMCW radar sensor and provide a second output,
the second plurality of elements being associated with a second receive chain of the FMCW radar sensor, and
the second plurality of elements causing the FMCW radar sensor to operate in a second mode associated with a third distance range,
the third distance range being different from the first distance range, and
the first plurality of elements and the second plurality of elements causing the FMCW radar sensor to operate in the first mode and the second mode concurrently.

18. The FMCW radar sensor of claim 17, where a first data output rate, associated with the first mode, matches a second data output rate associated with the second mode.

19. The FMCW radar sensor of claim 17, where the second plurality of elements includes flail another filter to perform band selection associated with a digital signal corresponding to the second receive chain.

20. The FMCW radar sensor of claim 15, further comprising:
a microcontroller to provide configuration information associated with reconfiguring the plurality of elements.

* * * * *

UNITED STATES PATENT AND TRADEMARK OFFICE
CERTIFICATE OF CORRECTION

PATENT NO. : 10,620,298 B2
APPLICATION NO. : 15/248662
DATED : April 14, 2020
INVENTOR(S) : Alexander Onic et al.

Page 1 of 1

It is certified that error appears in the above-identified patent and that said Letters Patent is hereby corrected as shown below:

In the Claims

In Claim 5, Column 14, Line 49, "plurality of elements includes flail another filter" should be changed to --plurality of elements includes another filter--;

In Claim 19, Column 16, Line 56, "plurality of elements includes flail another filter" should be changed to --plurality of elements includes another filter--.

Signed and Sealed this
Twenty-seventh Day of October, 2020

Andrei Iancu
*Director of the United States Patent and Trademark Office*